United States Patent
Peterson et al.

(10) Patent No.: US 8,954,878 B2
(45) Date of Patent: Feb. 10, 2015

(54) INFORMATION NAVIGATION ON ELECTRONIC DEVICES

(75) Inventors: Morten Just Peterson, Zurich (CH); Emmet Connolly, Zurich (CH); Joao Paulo Gil de Paiva, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/603,286

(22) Filed: Sep. 4, 2012

(65) Prior Publication Data
US 2014/0068494 A1    Mar. 6, 2014

(51) Int. Cl.
G06F 3/048    (2013.01)
(52) U.S. Cl.
USPC ............................. 715/778; 715/784; 715/864
(58) Field of Classification Search
USPC .................... 715/778, 784, 864; 345/156
See application file for complete search history.

(56) References Cited

U.S. PATENT DOCUMENTS

| | | | |
|---|---|---|---|
| 5,786,819 | A | 7/1998 | Weiser et al. |
| 6,340,979 | B1 | 1/2002 | Beaton et al. |
| 6,477,117 | B1 | 11/2002 | Narayanaswami et al. |
| 7,293,244 | B2 | 11/2007 | Randall |
| 7,506,269 | B2 | 3/2009 | Lang |
| 7,786,975 | B2 | 8/2010 | Ording et al. |
| 2002/0101457 | A1 | 8/2002 | Lang |
| 2006/0066588 | A1 | 3/2006 | Lyon et al. |
| 2006/0128305 | A1 | 6/2006 | Delalat |
| 2006/0167628 | A1 | 7/2006 | Karaoguz et al. |
| 2007/0254640 | A1 | 11/2007 | Bliss |
| 2007/0271513 | A1* | 11/2007 | Andren .................... 715/703 |
| 2008/0158170 | A1 | 7/2008 | Herz et al. |
| 2008/0195862 | A1 | 8/2008 | Bender et al. |
| 2009/0059730 | A1 | 3/2009 | Lyons et al. |
| 2009/0094562 | A1 | 4/2009 | Jeong et al. |
| 2009/0199130 | A1 | 8/2009 | Tsern et al. |
| 2009/0228122 | A1* | 9/2009 | Baier et al. ..................... 700/83 |
| 2009/0252311 | A1* | 10/2009 | Kuiken ................. 379/102.02 |
| 2009/0293007 | A1 | 11/2009 | Duarte et al. |
| 2009/0327953 | A1* | 12/2009 | Honkala et al. ............... 715/804 |
| 2010/0046486 | A1 | 2/2010 | Maruyama |
| 2010/0097322 | A1 | 4/2010 | Hu et al. |
| 2010/0112950 | A1 | 5/2010 | Haartsen et al. |

(Continued)

FOREIGN PATENT DOCUMENTS

EP    1 435 580 A2    7/2004

OTHER PUBLICATIONS

U.S. Appl. No. 13/607,057, by Morten Just Petersen et al., filed Sep. 7, 2012.

(Continued)

*Primary Examiner* — Steven Sax
*Assistant Examiner* — Christopher J Fibbi
(74) *Attorney, Agent, or Firm* — Shumaker & Sieffert, P.A.

(57) ABSTRACT

In one example, a method includes outputting for display a first graphical user interface (GUI) of an application executing at the portable computer terminal, wherein the first GUI displays information received from the mobile computing device at a first degree of specificity. The method also includes, in response to receiving input to display a second GUI of the application: outputting, for display at a presence-sensitive display device of the portable computer terminal, the second GUI and removing the first GUI from display. The second GUI may be different from the first GUI, and the second GUI may display information received from the mobile computing device at a second degree of specificity that is different than the first degree of specificity.

20 Claims, 5 Drawing Sheets

(56) References Cited

U.S. PATENT DOCUMENTS

| | | | |
|---|---|---|---|
| 2010/0112964 A1* | 5/2010 | Yi et al. | 455/90.3 |
| 2010/0211872 A1 | 8/2010 | Rolston et al. | |
| 2010/0233996 A1 | 9/2010 | Herz et al. | |
| 2010/0238123 A1 | 9/2010 | Ozias et al. | |
| 2010/0262928 A1* | 10/2010 | Abbott | 715/769 |
| 2010/0302172 A1 | 12/2010 | Wilairat | |
| 2011/0035708 A1 | 2/2011 | Damale | |
| 2011/0055546 A1 | 3/2011 | Klassen et al. | |
| 2011/0205851 A1 | 8/2011 | Harris | |
| 2011/0209099 A1 | 8/2011 | Hinckley et al. | |
| 2011/0291945 A1 | 12/2011 | Ewing, Jr. et al. | |
| 2012/0092383 A1 | 4/2012 | Hysek et al. | |
| 2012/0131519 A1 | 5/2012 | Jitkoff | |
| 2012/0154265 A1* | 6/2012 | Kim et al. | 345/156 |
| 2012/0166997 A1* | 6/2012 | Cho et al. | 715/778 |
| 2012/0169640 A1 | 7/2012 | Lin | |
| 2012/0194976 A1 | 8/2012 | Golko et al. | |
| 2012/0216146 A1* | 8/2012 | Korkonen | 715/835 |
| 2013/0254705 A1* | 9/2013 | Mooring et al. | 715/784 |

OTHER PUBLICATIONS

Apple—OS X Lion, "250+ New Features," retrieved from http://www.apple.com/macosx/whats-new/features.html, accessed on Nov. 15, 2011, 17pp.

Apple—Full-Screen Apps, "Full-Screen Apps, the app and nothing but the app.," retrieved from http://www.apple.com/macosx/whats-new/full-screen.html, accessed on Nov. 15, 2011, 4 pp.

"Quickly Switch Between Dashboard, Spaces & Full-Screen Apps in Lion [OS X Tips]," retrieved from http://www.cultofmac.com/108984/quickly-switch-between-desktop-spaces-full-screen-apps-in-lion-os-x-tips/, accessed on Nov. 15, 2011, 14 pp.

Apple—OS X Lion, "Changing the way you use your Mac. One Feature at a time," retrieved from http://www.apple.com/macosx/whats-new/, accessed on Nov. 15, 2011, 8 pp.

Ziegler, "Palm Pre for Dummies," retrieved from http://www.dummies.com/how-to/content/palm-pre-for-dummies-cheat-sheet.html, accessed on Nov. 15, 2011, 5 pp.

Branscombe, "Switching between apps: Using Windows 8 and the Metro Interface," Oct. 13, 2011, retrieved from http://www.tomsguide.com/us/Using-Windows-8-Metro-UI,review-1702-6.htm, 5 pp.

"Touch Usability, News and research on touch interface usability," retrieved from http://www.touchusability.com/, accessed on Nov. 15, 2011, 20 pp.

Rodriguez, "OS X Lion Gestures: Trackpad vs. Magic Mouse," Jul. 27, 2011, retrieved from http://mac.appstorm.net/how-to/os-x/lion-gestures-trackpad-vs-magic-mouse/, 18 pp.

Sande, "Lion's full-screen apps: Some hits, a lot of misses," Jul. 20, 2011, retrieved from http://www.tuaw.com/2011/07/20/lions-full-screen-apps-some-hits-a-lot-of-misses/, 4 pp.

Bilton, "Disruptions: The Next Wave for the Wristwatch," Aug. 19, 2012, retrieved from http://bits.blogs.nytimes.com/2012/08/19/disruptions-the-next-wave-for-the-wristwatch/?ref=technology, 6 pp.

Serrano et al., "Bezel-Tap Gestures: Quick Activation of Commands from Sleep Mode on Tablets," CHI'13, Apr. 27-May 2, 2013, Paris, France, 10 pages.

Roth et al., "Bezel Swipe: Conflict-Free Scrolling and Multiple Selection on Mobile Touch Screen Devices," CHI 2009, Apr. 4-9, 2009, Boston, Massachusetts, USA, 4 pages.

Bragdon et al., "Experimental Analysis of Touch-Screen Gesture Designs in Mobile Environments," CHI 2011, May 7-12, 2011, Vancouver, BC, Canada, 10 pages.

Hinckley et al, "Sensing Techniques for Mobile Interaction," ACM UIST 2000 Symposium on User Interface Software and Technology, CHI Letters 2 (2), pp. 91-100 (Nov. 2000).

Windows 8 & Windows RT Tutorial, downloadable from windows.microsoft.com/en-us/windows-8/all-about-apps?page=mouse4#mouse, downloaded on Jun. 25, 2013, 4 pages.

International Search Report and Written Opinion for International Application No. PCT/US2013/057878, dated May 28, 2014, 18 pp.

Caggiani: "Sony SmartWatch: Just How Smart Is It? Talkandroid.com:" May 7, 2012, retrieved from the internet: http://www.talkandroid.com/reviews/accessories/sony-smartwatch-just-how-smart-is-it/, 15 pages, retrieved on Feb. 28, 2004.

Captainevo: "First Tech Problems—Sony's Smartwatch—Better than LiveView, but still needs some work.", Apr. 26, 2012, retrieved from the Internet: http://captainevo.tumblr.com/post/21837234110/sonys-smartwatch-better-than-liveview-but-still, 10 pages, retrieved on Feb. 28, 2014.

Invitation to Pay Additional Fees and, Where Applicable, Protest Fee from PCT Application No. PCT/US2013/057878, 7 pages, dated Mar. 17, 2014.

* cited by examiner

INFORMATION NAVIGATION ON ELECTRONIC DEVICES

BACKGROUND

Mobile computing devices allow a user to perform a variety of functions, including various forms of communication and computing. For example, some mobile computing devices are capable of accessing the Internet, executing gaming applications, playing videos and music, as well as providing functionality of a traditional cellular telephone. In some examples, users may use multiple computing devices to access and manage information. Such computing devices may communicate with one another using short range wireless communication to share information.

SUMMARY

In one example, a method includes outputting, for display at a presence-sensitive display device of a portable computer terminal that is operatively coupled to a mobile computing device, a first graphical user interface (GUI) of a first application. The first application may be included in a group of applications that are ordered for display and executing at the portable computer terminal. The first GUI of the first application may display information received from the mobile computing device at a first degree of specificity. The method may also include receiving, at the presence-sensitive display device of the portable computer terminal, a first input indicating a request to display a second GUI of the first application. The method may further include, in response to receiving the first input: outputting, for display at the presence-sensitive display device of the portable computer terminal, the second GUI of the first application, and removing the first GUI of the first application from display, wherein the second GUI is different from the first GUI. The second GUI of the first application may display the information received from the mobile computing device at a second degree of specificity that is different than the first degree of specificity. The method may also include, while the second GUI of the first application is displayed and in response to receiving a second input indicating a request to display a first GUI of a second application in the group of applications: outputting, for display at the presence-sensitive display device of the portable computer terminal, the first GUI of the second application, and removing the second GUI of the first application from display without displaying the first GUI of the first application subsequent to the second input.

In one example, a computer-readable storage medium is encoded with instructions that, when executed, cause one or more processors of a computing device to perform operations including outputting, for display at a presence-sensitive display device of a portable computer terminal that is operatively coupled to a mobile computing device, a first graphical user interface (GUI) of an application executing at the portable computer terminal. The first GUI displays information may be received from the mobile computing device at a first degree of specificity. The mobile computing device may have received the information from a remote computing device. The computer-readable storage medium may also be encoded with instructions that, when executed, cause one or more processors of a computing device to perform operations including, in response to receiving input to display a second GUI of the application: outputting, for display at the presence-sensitive display device of the portable computer terminal, the second GUI and removing the first GUI from display. The second GUI may be different from the first GUI. The second GUI may also display information received from the mobile computing device at a second degree of specificity that is different than the first degree of specificity.

In one example, a computing device may include a user interface device that is operatively coupled to the computing device. The computing device may also include one or more processors that are configured to: output, for display at the user interface device, a first graphical user interface (GUI) associated with information originating from an information source, wherein the first GUI displays the information at a first degree of specificity; and in response to receiving input to display a second GUI associated with the information originating from the information source: output, for display at the user interface device, the second GUI and removing the first GUI from display. The second GUI may be different from the first GUI, and the second GUI may display the information at a second degree of specificity that is different than the first degree of specificity.

The details of one or more examples of the disclosure are set forth in the accompanying drawings and the description below. Other features, objects, and advantages will be apparent from the description and drawings, and from the claims.

DETAILED DESCRIPTION

In general, this disclosure is directed to techniques for improving user interactions with a presence-sensitive screen. Such techniques may improve a user's ability to use a device that easily switches between applications and details of applications that are displayed at a presence-sensitive screen having a limited display area. A portable computer terminal, such as a wristwatch having a processor and memory, may be operatively coupled to a computing device, such as a smart phone, tablet, etc., using wireless communication. The portable computer terminal may include a presence-sensitive screen that has limited display area. Consequently, in some examples, the portable computer terminal may display a graphical user interface of a single application at a time. The portable computer terminal may send and receive information with the computing device and further cause the presence-sensitive display to display such information to a user.

In accordance with techniques of the disclosure, a user can perform gestures at the presence-sensitive screen of the portable computer terminal to increase and/or decrease the degree of specificity of information displayed by the presence-sensitive screen for a single application. Moreover, in some examples, the user can perform a gesture at the presence-sensitive screen to navigate from a more detailed view of information for one application to a less detailed view of information for a different application. In still other examples, techniques of the disclosure allow the user to use the terminal to navigate between different applications of the portable computer terminal. In this way, the user can quickly navigate between different applications and different degrees of specificity of information for the various applications displayed at a presence-sensitive screen with a limited display area.

Figure 1:
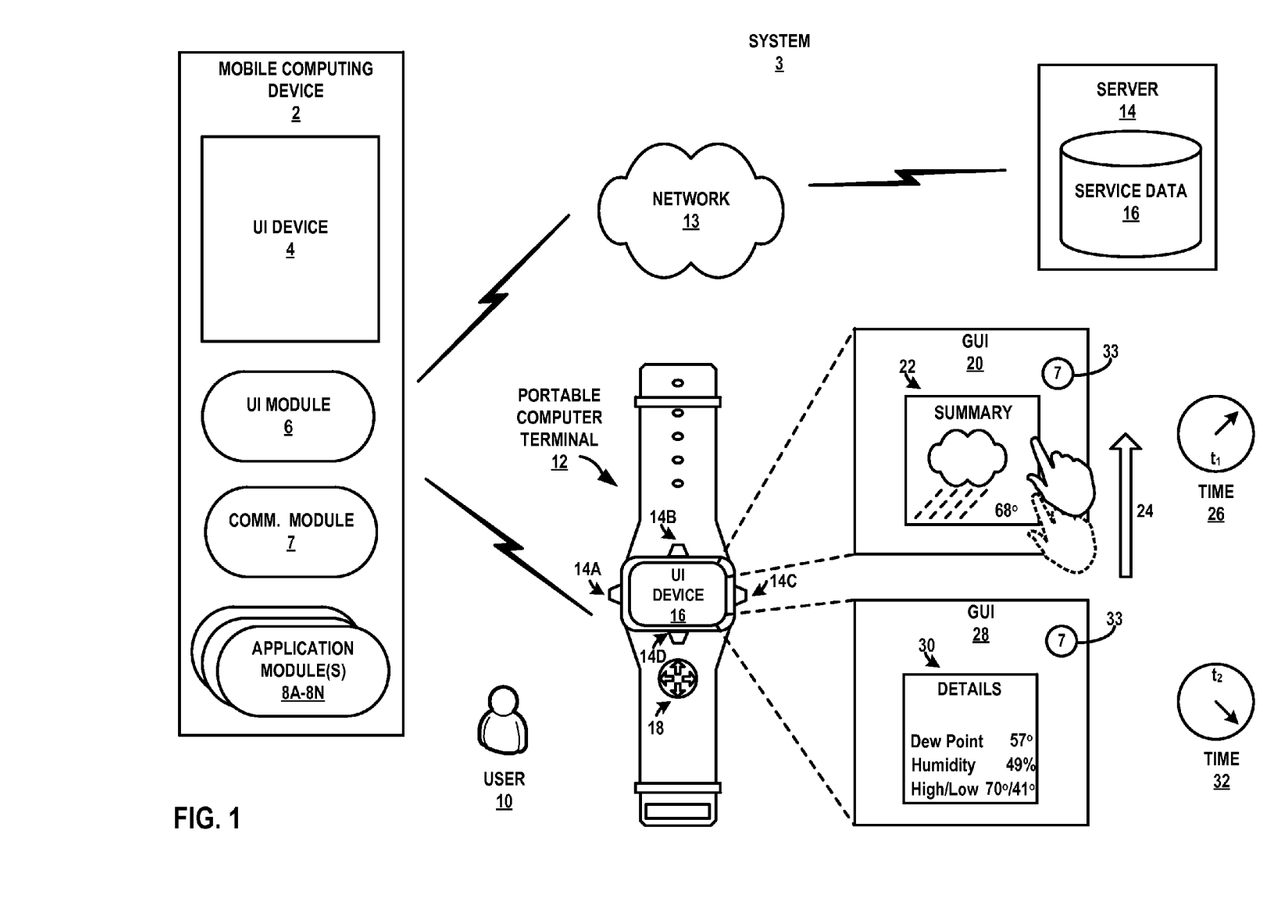
FIG. 1 is a block diagram illustrating an example system that includes a portable computer terminal and computing device, in accordance with one or more techniques of the present disclosure.

FIG. 1 is a block diagram illustrating an example system 3 that includes a portable computer terminal 12 and computing device 2, in accordance with one or more techniques of the present disclosure. As shown in FIG. 1, system 3 may also include a server 14 in some examples. Mobile computing device 2 may be operatively and/or communicatively coupled by network 13 to server 14. In this way, mobile computing device 2 may send and receive information with server 14. Mobile computing device 2 may also be operatively and/or communicative coupled to portable computer terminal 12, for example, using wireless communication, such as Bluetooth, Near-Field Communication, etc. In this way mobile computing device 2 may send and receive information with portable computer terminal 12.

Computing device 2 and portable computer terminal 12 may be associated with user 10. A user associated with a computing device, such as computing device 2 and/or portable computer terminal 12, may interact with the computing device by providing various user inputs to the computing device. In some examples, user 10 may have one or more accounts that are associated with one or more services provided by server 14, portable computer terminal 12, and computing device 2, such as a social networking service and/or telephone service. The accounts may be registered with one or more computing devices associated with user 10, such as computing device 2 and portable computer terminal 12.

As shown in FIG. 1, user 3 may be associated with mobile computing device 2 and portable computer terminal 12. In some examples, portable computer terminal 12, or another such portable computer terminal, may not be capable of or may not practically include significant processing capabilities, but may provide a convenient mechanism by which user 3 may view information associated with one or more applications that present data relevant to user 3. For example, portable computer terminal 12 can include a display device 16, such as a liquid crystal display (LCD). User 3 may view information on display device 16, such as weather information, email, text messages, etc. In some examples, portable computer terminal 12 may receive the information from mobile device 2. Thus, the cost, complexity, and/or size of portable computer terminal 12 may be kept relatively small by leveraging the processing and communications capabilities of mobile device 2 to retrieve, process, and render the information sent for display at portable computer terminal 12. In some examples, portable computer terminal 12 may enable user 3 to provide user input, for example, to navigate between multiple applications, multiple screens of a single application, and/or change the degree of specificity of information displayed for a single application. Thus, the processing, communication and display of such information may be distributed between mobile computing device 2, portable computer terminal 12, and server 14.

Mobile computing device 2 may include any number of different portable electronic mobile devices, including, e.g., cellular phones, personal digital assistants (PDAs), laptop computers, portable gaming devices, portable media players, e-book readers, watches, as well as non-portable devices such as desktop computers. Mobile computing device 12 may include various input and output components, including, e.g. one or more processors, memory, telemetry modules, cellular network antennas, a display, one or more UI elements, sensors, and a power source like a rechargeable battery. Further details of mobile computing device 12 are described in FIG. 2.

Mobile computing device 2 may include user interface (UI) device 4. In some examples, UI device 4 is configured to receive tactile, audio, or visual input. Examples of UI device 4 may include a touch-sensitive and/or a presence-sensitive screen or any other type of device for receiving input. UI device 4 may also output for display, graphical content such as a graphical user interface (GUI). In the example of FIG. 1, UI device 4 may be a touch-sensitive screen that can display a graphical user interface and receive input from a user using capacitive or inductive detection at or near the touch-sensitive screen.

As shown in FIG. 1, computing device 2 may include user interface (UI) module 6. UI module 6 may perform one or more operations to process received inputs, such as user input or network data, and send such inputs to other components associated with computing device 2, such as applications modules 8. UI module 6 may also receive data from components associated with computing device 2, such as application module 8A. Using the data, UI module 6 may cause other components associated with computing device 2, such as UI device 4, to display output based on the data. For instance, UI module 6 may receive data from application module 8A that causes UI device 4 to display GUIs 20 and/or 28.

Mobile computing device 2 may also include a communication module 7. Communication module 7 may manage communications between mobile computing device 2 and server 14. Communication module 7 may also manage communication between mobile computing device 2 and portable computer terminal 12. For instance, communication module 7 may send and receive information with server 14 and portable computer terminal 12. As one example, communication module 7 may receive information from server 14. Communication module 7 may send the information to one of application modules 8A-8N for processing. Upon processing the information, the application may send the information to communication module 7, which may in turn send the information to portable computer terminal 12. In a similar manner, communication module 7 may receive information from portable computer terminal 12. Communication module 7 may send to the information to one of application modules 8A-8N for processing. In some examples, communication module 7 may receive the information and send such information to server 14.

As shown in FIG. 1, mobile computing device 2, in some examples, includes one or more application modules 8A-8N (hereinafter "application modules 8"). Application modules 8 may include functionality to perform any variety of operations on computing device 2. For instance, application modules 8 may include an email application, text messing application, instant messaging application, weather application, stock market application, emergency alert application, sports application, office productivity application, multimedia player, etc. In some examples, one or more of application module 8 may use HTML5 to implement techniques of the disclosure and/or display information. As described in the example of FIG. 1, application module 8A may perform operations of a weather application that retrieves weather information from server 14. As will be further described below, application 8A may receive weather information from server 14 and send the weather information to portable computer terminal 12 for display.

Network 13 may include one or more terrestrial and/or satellite networks interconnected to provide a means of communicatively coupling mobile computing device 2 to server 14 and/or portable computer terminal 12. For example, network 13 may be a private or public local area network (LAN) or Wide Area Network (WANs). Network 13 may include both wired and wireless communications according to one or more standards and/or via one or more transport mediums. For example, network 13 may include wireless communications according to one of the 802.11 or Bluetooth specification sets, or another standard or proprietary wireless communication protocol. Network 13 may also include communications over a terrestrial cellular network, including, e.g. a GSM (Global System for Mobile Communications), CDMA (Code Division Multiple Access), EDGE (Enhanced Data for Global Evolution) network. Data transmitted over network 13, e.g., from mobile computing device 2 to server 14 may be formatted in accordance with a variety of different communications protocols. For example, all or a portion of network 13 may be a packet-based, Internet Protocol (IP) network that communicates data from mobile computing device 2 to server 14 in Transmission Control Protocol/Internet Protocol (TCP/IP) packets, over, e.g., Category 5, Ethernet cables.

As shown in FIG. 1, mobile computing device 3 may communicate via network 13 with server 14. Server 14, in some examples, may be a personal computer, a laptop computer, a handheld computer, a workstation, a data storage system, a supercomputer, or a mainframe computer. In some examples, server 14 may execute one or more applications that provide services to mobile computing devices, such as mobile computing device 2. Examples of such services may include an email service, instance messaging service, search service, social networking service, weather service, stock market service, video game service, etc. As is further described herein, mobile computing device 2 and/or portable computer terminal 12 may use such services provided by server 14.

Server 14 may also include service data 16. Service data 16 may be any data stored, generated, sent, received, and/or processed by server 14. For instance, service data 16 may include data relating to services provided by server 14 In some examples, service data 16 may be stored in any suitable data structure, such as a database, lookup table, array, large-scale data storage system, etc.

As shown in FIG. 1, mobile computing device 2 may communicate with portable computer terminal 12. In some examples, portable computer terminal 12 may be a wrist-watch or pocket watch. In other examples, portable computer terminal 12 may be any computing device that is coupled to a device or apparatus that may be further attached to the body or clothing on the person of user 10. For instance, portable computer terminal 12 may be a computing device with a processor and memory that is further attached to a wristband, which may be fastened on user 10's wrist. Portable computer terminal 12 may be a computing device affixed to a magnet that may be attached to an appliance, such as a refrigerator, washing machine, etc. In other examples, computer terminal 12 may be a pin or button attached to a computing device that user 10 may affix the clothing of his/her person.

As shown in FIG. 1, portable computer terminal 12 may include, in addition to a processor and a memory, a user interface (UI) device 16. In some examples, UI device 16 is configured to receive tactile, audio, or visual input. Examples of UI device 16 may include a touch-sensitive and/or a presence-sensitive screen or any other type of device for receiving input. UI device 16 may also output for display, graphical content such as graphical user interface (GUI) 20 and GUI 28. In the example of FIG. 1, UI device 16 may be a touch-sensitive screen that can display a graphical user interface and receive input from a user using capacitive or inductive detection at or near the touch-sensitive screen.

In some alternative examples, UI device 16 may be a display device that does not detect an input unit such as a finger or stylus. Instead, UI device 16 may display graphical content and portable computer terminal 12 may receive input using input controls 14A-14D or input control 18. In some examples, portable computer terminal 12 may include input controls 14A-14D, which may be buttons that user 10 may select by pressing. When user 10 presses a button, the portable computer terminal 12 may determine the button has been pressed and perform one or more operations associated with the button. In a different example, input control 18 may be a directional input pad. By pressing different portions of the directional input pad, portable computer terminal 12 may determine different operations associated with the different portions of the directional input pad. In some examples, one or more input controls may be included even if UI device 16 is a touch-sensitive or presence-sensitive screen.

In some examples, portable computer terminal 12 may include one or more predetermined regions of UI device 16 that, when an input is received within the predetermined regions, cause portable computer terminal 12 to perform operations described within this disclosure. For instance, portable computer terminal 12 may determine an area comprising a perimeter UI device 16 having a predetermined width. Consequently, when user 10 performs a touch gesture at a location of UI device 16, portable computer terminal 12 may determine whether the location of the touch gesture is within the predetermined region of UI device 16. If the touch gesture is within then predetermined region, portable computer terminal may perform an operation as described in this disclosure, e.g., outputting GUI 28 and removing from display GUI 28 at UI device 16. In some examples, different regions may be associated with different operations. For instance a region at the bottom edge of UI device 16 may, when a tap gesture is received within the region, display GUI 28 and remove from display GUI 20 at UI device 16.

In accordance with aspects of the present disclosure, portable computer terminal 12 may send and receive information with mobile computing device 2 using short-range wireless communication. For instance, portable computer terminal 12 may include one or more applications that send and receive information with application modules 8A-8N. User 10 may view information received by portable computer terminal 12 from mobile computing device 2 at UI device 16. In one example as shown in FIG. 1, portable computer terminal 12 may include a weather service application. The weather service application may receive weather information from one of application modules 8 using short-range wireless communication. Application module 8A may, initially, receive such weather information from server 14, which provides a weather service. Consequently, if user 10 wishes to determine the current weather conditions, user 10 may view UI device 16, which may display information for the current weather conditions. In some examples, information sent and received by mobile computing device 2 may be context-sensitive. That is, the information may be based on the detected sound, light, geoposition, motion, etc., that is detected by mobile computing device 2.

In some examples, the weather service application of portable computer 12 may provide a notification to user 10 in response an event. For instance, application module 8A may send information to portable computer terminal 12 that indicates a severe weather event. Portable computer terminal 12, in response to receiving the information, may determine the event and further determine a corresponding notification. In some examples, the notification may be feedback generated by portable computer terminal 12 that is audio, visual, haptic, etc. Consequently, portable computer terminal 12 may provide the notification to user 10 upon determining the event (e.g., the severe weather event).

In some examples, UI device 16 of portable computer terminal 12 may include a smaller display area than UI device 4 of mobile computing device 2. Consequently, in some examples, UI device 16 may only display a graphical user interface of a single application at a time. In this way, portable computer terminal 12 enables user 10 to easily and comfortably view the information of a single application. For instance, portable computer terminal 12 may concurrently execute one or more applications using multitasking and/or multiprogramming techniques. However, UI device 16 may display a graphical user interface of only a single application at a time.

Techniques of the present disclosure may enable a user to quickly and easily change the degree of specificity of information displayed by a UI device of a portable computer terminal. For instance, a user may, in some examples, provide a user input (e.g., horizontal swipe gesture) to change the application that is currently displayed by the UI device. For instance, the user may be able to navigate through the group of applications on the portable computer terminal by providing such user inputs. Techniques of the present disclosure may improve the user's ease of viewing, selecting, and changing the information displayed by the UI device for a particular application by enabling the user to change the degree of specificity of information displayed for the particular application. For instance, the UI device may initially display a summary of information for a particular application having a first degree of specificity. In response to receiving a user input (e.g., a vertical swipe gesture), portable computer terminal may cause the UI device to display more detailed information for the particular application at a second degree of specificity that is that is different than (e.g., greater than) the first degree of specificity. While viewing the more detailed information, techniques of the present disclosure may enable the user to provide, for example, a first user input (e.g., vertical swipe gesture) to return to the first degree of specificity of the information. Alternatively, techniques of the disclosure enable the user to provide a second user input (e.g., horizontal swipe gesture) to change to a second, different application that displays information of the second application at a degree of specificity that is less than the second degree of specificity of the first application. In this way, techniques of the disclosure may enable the user to quickly and easily navigate between different applications and between different degrees of specificity of information displayed by the applications when a UI device displays a graphical user interface of a single application at a time. Techniques of the disclosure are now described with respect FIG. 1.

As shown in FIG. 1, portable computer terminal 12 may include a group of applications. The group of applications may be ordered for display by portable computer terminal 12. For instance, as further described in examples of the disclosure, the applications may be ordered for display based on a priority values of the applications and/or priority values of information received by the application. The group of applications may be ordered on any suitable criteria, such as priority, frequency of use, etc. Portable computer terminal 12 may order the applications for display such that a user may navigate through the applications in the determined order. In some examples, the user may navigate the applications in forward or reverse order (e.g., from a lowest ordered application to highest ordered application or vice versa). Thus, when navigating from a lower ordered application to a higher ordered application, in some examples a user may navigate past one or more ordered applications between the lower ordered application and the higher ordered application. As one example further described in FIG. 3, "Application A" that is associated with GUI 90 may be a lower ordered application than "Application C" that is associated with GUI 96.

In the example of FIG. 1, the group of applications may include a weather service application. Portable computer terminal 12 may cause UI device 16 to initially display GUI 20 of the weather service application. The weather service application of portable computer terminal 12 may receive weather information from a weather service application (e.g., application module 8A) of mobile computing device 2 using short-range wireless communication. Application module 8A may have initially received the weather information from a weather service provided by server 14.

In accordance with techniques of the disclosure, portable computer terminal 12 may display the weather information at particular degree of specificity (e.g., a first degree of specificity). For example, a degree of specificity may define a quantity of information that is included in GUI 20. In some examples, the quantity of information may refer to the number of characters included in GUI 20 that are based on the information. The quantity of information may also refer to the quantity, size, and/or orientation of graphical objects included in GUI 20. Graphical objects may include images, videos, or any other graphical representations that may be displayed by UI device 16. Consequently, including a greater quantity of characters and/or graphical objects in a graphical user interface may cause UI device 16 to display a greater degree of specificity of information. Conversely, including a smaller quantity of characters and/or graphical objects in a graphical user interface may cause UI device 16 to display a lower degree of specificity of the information.

In some examples, a degree of specificity may refer to the semantic content of the information included in the graphical user interface. For instance, when displaying a lower degree of specificity of information, UI device 16 may display less specific and/or more summarized portions of the information. Conversely, UI device 6 may display a higher degree of specificity of information by display more specific and/or more detail portions of the information. As one example, a weather service application may display a lesser degree of specificity of weather information by displaying a graphical object that summarizes the current weather conditions (e.g., a cloud with rain to indicate it is currently raining) The weather service application may, in response to a user input, cause UI device 16 to display a greater degree of specificity of weather information by displaying the current humidity, dew point, wind speed, wind direction, probability of precipitation, etc. Such techniques to change degrees of specificity of information can be adapted to any suitable information, such as emergency alert information, stock market information, email information, etc.

Continuing with the example of FIG. 1, GUI 20 includes weather information received by UI device 16. GUI 20 includes the weather information 22 at a first degree of specificity that indicates current weather conditions and a current temperature. Consequently, at the first degree of specificity of the information, GUI 20 may include a summary of the current weather conditions.

In the current example, user 10 may wish to view more detailed information of the weather service application. Consequently, user 10 may perform a gesture 24 at UI device 16 such that UI device 16 detects the gesture. User 2 may perform gesture 24 at time 26. In one example, gesture 24 may be a vertical swipe gesture from the bottom portion of GUI 20 to the top portion of GUI 20 as indicated by the arrow of gesture 24. In response to receiving the user input, portable computer terminal 12 may cause UI device 16 to display GUI 28 and remove GUI 20 from display. At time 32, which occurs at a later time than time 26, UI device 16 consequently displays GUI 28. In some examples, displaying GUI 28 and removing the GUI 20 from display of UI device 16 does not cause a portion of existing graphical content of GUI 20 to be visually magnified in GUI 28. Thus, in some examples, portable computer terminal 12 may not magnify information of GUI 20 to increase the size of graphical content, but instead may display at least some and/or all information in GUI 28 that is different from GUI 20.

As shown in FIG. 1, GUI 28 may be different from GUI 20. However, GUI 28 may be generated by and/or associated with the same weather service application that previously generated GUI 20. GUI 28 may include weather information received by portable computer terminal 12 from mobile computing device 2. GUI 28 includes weather information 30 at a second degree of specificity that indicates dew point, humidity, and predicted high/low temperatures. In other examples, the weather information displayed at a second degree of specificity may indicate a forecast of temperatures for a number of days subsequent to the current date. As shown in FIG. 1, the second degree of specificity of weather information included in GUI 28 (e.g., weather details) is different than the first degree of specificity of weather information included in GUI 20 (e.g., weather summary). In the example of FIG. 1, the second degree of specificity of the weather information is greater than the first degree of specificity of information. In this way, user 10 may provide a user input to view weather service information at a different degree of specificity for the weather service application, in accordance with techniques of the disclosure.

Figure 3:
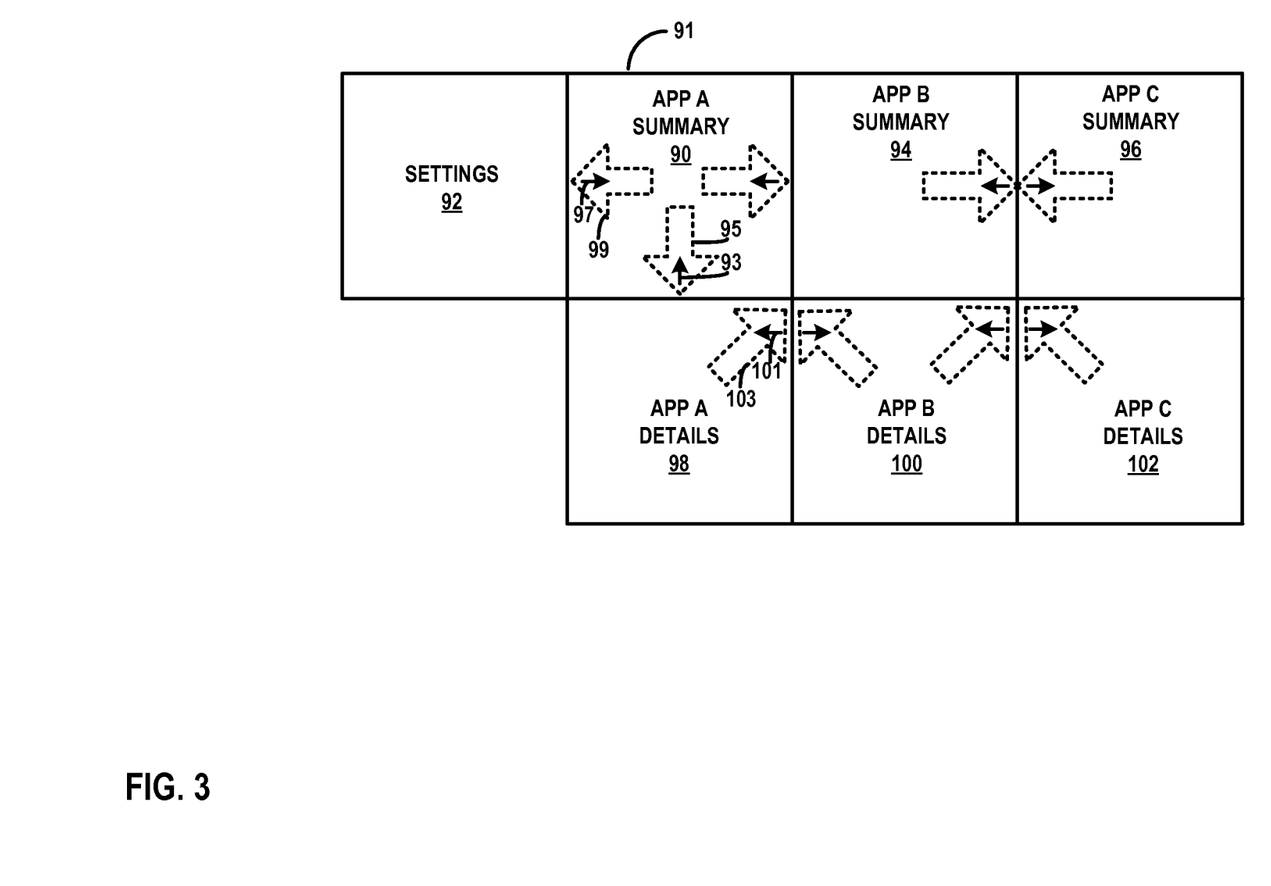
FIG. 3 is a conceptual diagram illustrating navigation of information to display different degrees of specificity of information, in accordance with techniques of the disclosure.

As will be further described in FIG. 3, techniques of the disclosure implemented by portable computer 10 also enable user 10 to return back to GUI 20 in response to receiving a subsequent user input (e.g., a vertical swipe gesture in a direction opposite to gesture 24). Alternatively, user 10 may provide a user input (e.g., a horizontal swipe gesture) while UI device 16 display GUI 28, such that the user input causes portable computer terminal 12 to select a different application for display at UI device 16. In response to determining the horizontal swipe gesture, UI device 16 may immediately display the GUI associated with the different application without first performing a vertical swipe gesture to return to GUI 20. UI device 16 may initially display information of the different application at a first degree of specificity that is less than a second degree of specificity of information displayed by the different application. Consequently, fewer gestures may be required to quickly and easily navigate from a more detailed view of one application to a summary view of a different application.

In some examples, portable computer terminal 12 may cause UI device 16 to display a quantity of applications executing on portable computer terminal 12. For instance, portable computer terminal 12 may initially determine the quantity of applications executing on portable computer terminal 12. In one example, portable computer terminal 12 may identify one or more processes included in a process table and determine the number of processes that are associated with applications displayable by UI device 16. Upon determining the quantity of applications, portable computer terminal 12 may cause UI device 16 to display application indicator 33 in GUI 20 and/or GUI 28. In this way, user 10 can view application indicator 33, which may indicate the number of applications executing on portable computer terminal 12 and displayable by UI device 16.

In some examples, the input provided by user 10 may be haptic input rather than a touch gesture detected at UI device 16. Haptic input may be input wherein a movement of portable computer terminal 12 performed by user 10 causes a change in acceleration of portable computer terminal 12. For instance, if portable computer terminal 12 is a wristwatch that is worn by user 10, user 10 may twist his/her wrist to cause a change in acceleration of portable computer terminal 12. In response to determining the change in acceleration, portable computer terminal 12 may perform an operation associated with the change in acceleration. One example operation may include removing the currently displayed GUI from UI device 16 and displaying a default GUI. The default GUI may be specified by user 10 or may be identified by a default value. The default GUI may be the GUI of a highest priority application (e.g., as further described in FIG. 3). In a different example, the operation may include associating the currently displayed information and/or application with a value to specify that user 10 does not wish to the see the application and/or information. Consequently, portable computer terminal 12 may remove the GUI of the application and/or information from display at UI device 16.

Techniques of the present disclosure have been described with respect to one or more application modules 8 that may send and receive information with server 14 and applications executing on portable computer terminal 12. In some examples, portable computer terminal 12 may communicate with server 12 without communicating with mobile computing device 2. In such examples, portable computer terminal 12 may include one or more components as further described in FIG. 2 to communicate with server 14, without communicating mobile computing device 2. In some examples, each application executing on portable computer terminal 12 may communicate with a different one of application modules 8. In other examples, multiple applications of mobile computing device 2 may communicate with a single application executing at portable computer terminal 12. Similarly, in some examples, multiple applications executing at portable computer terminal 12 may communicate with a single application executing at mobile computing device 2.

Techniques of the present disclosure have been described, in some examples, as changing a degree of specificity of information displayed for different applications. In alternative examples, techniques may be performed to change a degree of specificity of information displayed based on different sources of the information. Thus, portable computer terminal 12 may display information in GUIs according to the source of information rather than the application associated with the information. Consequently, in one example, a single application executing at portable computer terminal 12 may receive, from mobile computing device 2, different information that originated from different sources of the information. Thus, portable computer terminal 12 may receive weather information originating from a weather service, stock market information originating from a stock market service, etc.

The application executing at portable computer terminal 12 may generate separate GUIs for display (e.g., weather summary and weather details GUIs, stock market summary and stock market GUIs, etc.) at UI device 16 that correspond to the different information (e.g., weather information, stock market information, etc.) from the different sources of information (e.g., weather information service, stock market information service, etc.). Therefore a different weather application, stock application, etc., may not be individually executing on portable computer terminal 12. Instead, user 10 may navigate between different GUIs using the single application according to techniques of the disclosure, wherein each GUI corresponds to information of a source of information. In some examples, each of the different information from the different sources may be initially receive by mobile computing device 2 and sent to portable computer terminal 12. Techniques of the disclosure as described herein may be used by portable computer terminal 12 to change between different degrees of specificity of the information as described with respect to applications in this application.

Figure 2:
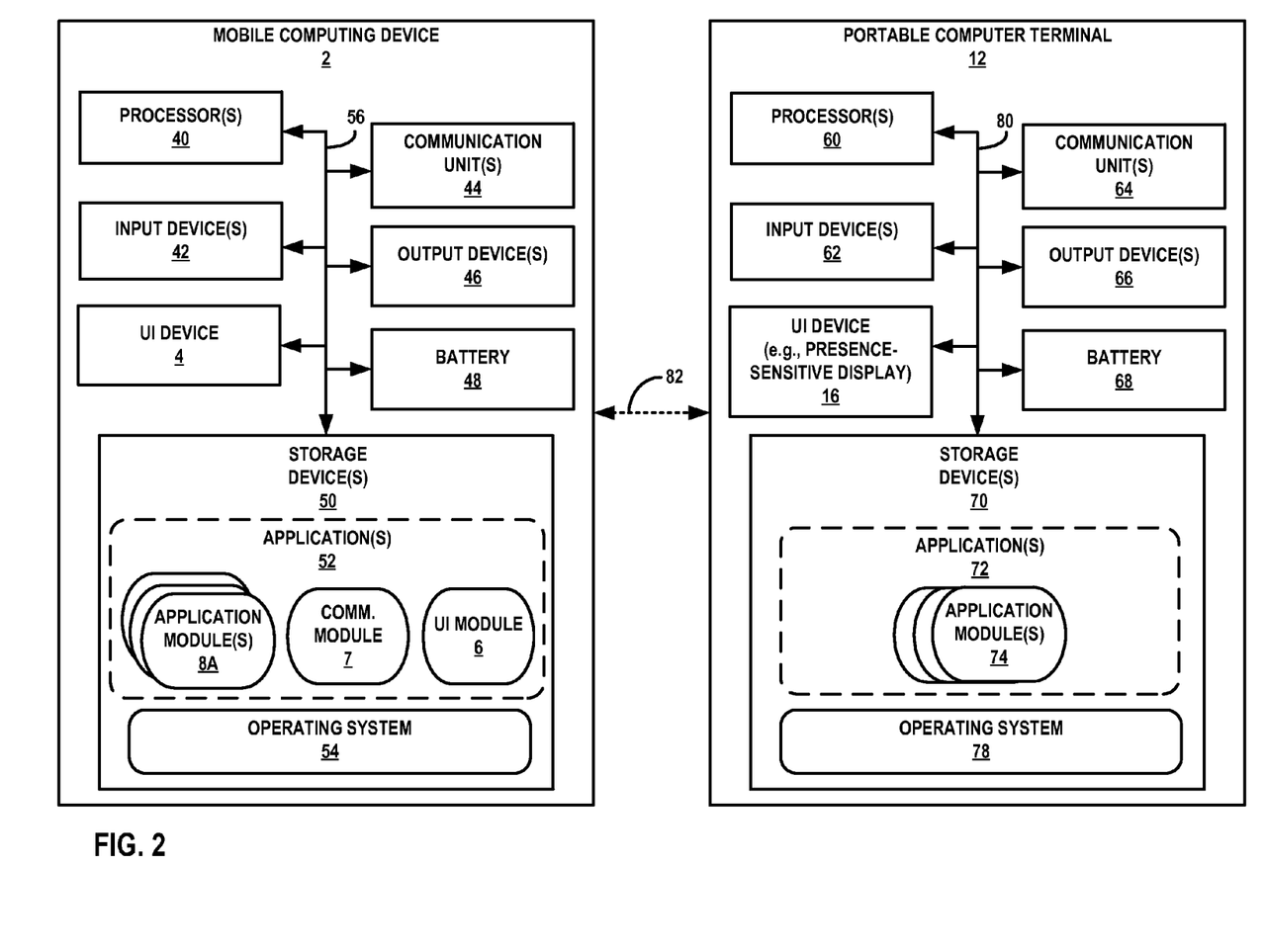
FIG. 2 is a block diagram illustrating further details of one example of a mobile computing device and portable computer terminal shown in FIG. 1, in accordance with one or more aspects of the present disclosure.

FIG. 2 is a block diagram illustrating further details of one example of a mobile computing device and portable computer terminal shown in FIG. 1, in accordance with one or more aspects of the present disclosure. FIG. 2 illustrates only one particular example of mobile computing device 2 and portable computer terminal 12, and many other examples of mobile computing device 2 and portable computer terminal 12 may be used in other instances.

As shown in the example of FIG. 2, mobile computing device 2 includes one or more processors 40, one or more input devices 42, one or more communication units 44, one or more output devices 46, battery 48, one or more storage devices 50, and user interface (UI) device 4. Computing device 2, in one example, further includes applications 52 and operating system 54 that are executable by mobile computing device 2. Each of components 4, 40, 42, 44, 46, 48 and 50 may be interconnected (physically, communicatively, and/or operatively) for inter-component communications. In some examples, communication channels 56 may include a system bus, network connection, inter-process communication data structure, or any other channel for communicating data. As one example in FIG. 2, components 4, 40, 42, 44, 46, 48, and 50 may be coupled by one or more communication channels 56. Applications 52 (including modules 6, 7, and 8) and operating system 54 may also communicate information with one another as well as with other components in computing device 2.

As shown in the example of FIG. 2, portable computer terminal 12 includes one or more processors 60, one or more input devices 62, one or more communication units 64, one or more output devices 66, battery 48, UI device 16, one or more storage devices 70, and user interface (UI) device 16. Portable computer terminal 12, in one example, further includes applications 72 and operating system 78 that are executable by portable computer terminal 12. Each of components 16, 60, 62, 64, 66, 68 and 70 may be interconnected (physically, communicatively, and/or operatively) for inter-component communications. In some examples, communication channels 80 may include a system bus, network connection, inter-process communication data structure, or any other channel for communicating data. As one example in FIG. 2, components 16, 60, 62, 64, 66, 68 and 70 may be coupled by one or more communication channels 80. Applications 72 (including modules 74) and operating system 78 may also communicate information with one another as well as with other components in portable computer terminal 12.

Processors 40 and 60, in one example, are configured to implement functionality and/or process instructions for execution within mobile computing device 2 and portable computer terminal 12, respectively. For example, processors 40 and 60 may be capable of processing instructions stored in storage devices 50 and 70, respectively. Examples of processors 40 and 60 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 50 and 70 may be configured to store information within mobile computing device 2 and portable computer terminal 12, respectively, during operation. Storage devices 50 and 70, in some examples, are described as computer-readable storage mediums. In some examples, storage devices 50 and 70 are temporary memory, meaning that a primary purpose of storage devices 50 and 70 is not long-term storage. Storage devices 50 and 70, in some examples, are described as volatile memory, meaning that storage devices 50 and 70 do not maintain stored contents when the computer is turned off. Examples of volatile memories include random access memories (RAM), dynamic random access memories (DRAM), static random access memories (SRAM), and other forms of volatile memories known in the art. In some examples, storage devices 50 and 70 are used to store program instructions for execution by processors 40 and 60, respectively. Storage devices 50 and 70, in one example, are used by software or applications running on mobile computing device 2 (e.g., applications 52) and portable computer terminal 12 (e.g., applications 72), respectively, to temporarily store information during program execution.

Storage devices 50 and 70, in some examples, also include one or more computer-readable storage media. Storage devices 50 and 70 may be configured to store larger amounts of information than volatile memory. Storage devices 50 and 70 may further be configured for long-term storage of information. In some examples, storage devices 50 and 70 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Mobile computing device 2 and portable computer terminal 12, in some examples, also include one or more communication units 44 and 64. Mobile computing device 2 and/or portable computer terminal 12 can utilize communication units 44 and 64, respectively, to communicate with external devices. In some examples, the communication may be via one or more networks, such as one or more wireless networks. Communication units 44 and/or 64 may be a network interface card, such as an Ethernet card, an optical transceiver, a radio frequency transceiver, or any other type of device that can send and receive information. Other examples of such network interfaces may include Bluetooth, Near-Field Communication (NFC), 3G, and WiFi radios. Still other examples include Universal Serial Bus (USB) and IEEE 1394 (otherwise known as FireWire). In some examples, mobile computing device 2 utilizes one of communication units 44 to wirelessly communicate with one of communication units 66 of portable computer terminal 12 using short-range wireless communication, such as Bluetooth or NFC. Examples ranges of short-range wireless communication may include 10 meters, 5 meters, 0.1 meters and 0.02 meters. For instance, two computing devices may communicate using short-range wireless communication over a range of 10 meters or less in one example. In a different example, two computing devices may communicate using short-range wireless communication over a range of 0.1 meters or less. In some examples, mobile computing device 2 utilizes one of communication units 44 to communicate with server 14 using a packet-based network.

Mobile computing device 2 and portable computer terminal 12 may also include one or more input devices 42 and 62, respectively. Input devices 42 and 62, in some examples, are configured to receive input from a user through tactile, audio, or visual feedback. Examples of input devices 42 and 62 include a presence-sensitive display, a touch-sensitive screen, a mouse, a keyboard, a voice responsive system, video camera, microphone or any other type of device for detecting a command from a user.

One or more output devices 46 and 64 may also be included in mobile computing device 2 and portable computer terminal 12, respectively. Output devices 46 and 66, in some examples, are configured to provide output to a user using tactile, audio, or visual stimuli. Output devices 46 and 66, in one example, may include a presence-sensitive display, touch-sensitive screen, a sound card, a video graphics adapter card, or any other type of device for converting a signal into an appropriate form understandable to humans or machines. Additional examples of output devices 46 and 66 include a speaker, a cathode ray tube (CRT) monitor, a liquid crystal display (LCD), or any other type of device that can generate intelligible output to a user. In some examples, UI devices 4 and 16 may include functionality of input device 42, 62 and/or output devices 46, 66. In the example of FIG. 2, UI devices 4 and 16 may be touch-sensitive screens.

Mobile computing device 2 and portable computer terminal 12 may include operating systems 54 and 78, respectively. Operating system s 54 and 78, in some examples, control the operation of components of mobile computing device 2 and portable computer terminal 12. For example, operating systems 54, in one example, facilitates the communication of applications 52 with processors 40, communication unit 44, storage device 50, input device 42, and output device 46, and UI device 4. As shown in FIG. 2, applications 52 may include UI module 6, communication module 7, and application modules 8, as described in FIG. 1. Applications 52 may each include program instructions and/or data that are executable by computing device 2. As one example, UI module 6 may include instructions that cause mobile computing device 2 to perform one or more of the operations and actions described in the present disclosure. Operating system 78 of portable computer terminal 12 may include the same functionality as operating system 54 or a subset of functionality of operating system 54.

In accordance with techniques of the disclosure, application module 8 of mobile computing device 2 may receive information from communication unit 44. The information received from communication unit 44 may further have been received from a remote computing device such as server 14 as shown in FIG. 1. Upon receiving the information, application module 8 may cause communication unit 44 to send the information to portable computer terminal 12 using communication channel 82. Communication channel 82 may be any wired or wireless communication channel. In some examples, mobile computing device 2 and portable computer terminal 12 may be initially configured to communicate information using communication channel 82.

Communication unit 64 of portable computer terminal 12 may initially receive the information from mobile computing device 2. Communication unit 64 may send the information to application module 74. Application module 74 may be a weather application that is capable of generating graphical user interfaces that include the information, such as GUI 20 and GUI 28, as shown in FIG. 1. Upon receiving the information, application module 74 may cause UI device 16 to a first graphical user interface (GUI), e.g., GUI 20 of application 74 executing at portable computer terminal 12. GUI 20 displays the information received from mobile computing device 2 at a first degree of specificity as previously described in FIG. 1.

User 10 may wish to view more specific details of the information associated with application module 74. Consequently, user 10 may perform a touch gesture at UI device 16. In response to detecting the touch gesture, UI device 16 may send data to application module 74 that indicates the gesture. In response to receiving the data, application module 74 may perform an operation associated with the gesture, e.g., generating for display, GUI 28. Application module 74 may cause UI device 16 to display GUI 28 and remove GUI 20 from display at UI device 16. GUI 28 may be different from GUI 20. Moreover, GUI 28 may display the information received from mobile computing device 2 at a second degree of specificity that is greater than the first degree of specificity at which the information was displayed in GUI 20.

In some examples, UI device 16 of portable computer terminal 12 may include only a limited display area. Consequently, if user 10 wishes to take action in response to information displayed at UI device 16, user 10 may not be able to do so at portable computer terminal 12. Instead, user 10 may need to perform additional actions at mobile computing device 2. Techniques of the present disclosure enable a user to take such actions.

In the current example of FIG. 2, user 10 may wish to view additional weather information at mobile computing device 2. Consequently, user 10 may perform a touch gesture at UI device 16. UI device 16 may detect the touch gesture and send data to application module 74 that indicates the touch gesture. Application module 74, in response to determining the touch gesture may cause communication unit 64 to send a message to mobile computing device 2 using communication channel 82. The message may be usable by mobile computing device 2 to perform an operation associated with application module 8. In the current example, application module 8 may be associated with application module 74 in that the applications communicate information with one another.

In one example, the message sent by portable computer terminal 12 may indicate an operation to be performed by application module 8. For instance, the message may indicate that application module 8 may cause UI device 4 to display a GUI associated with application module 8 (e.g., a GUI indicating weather information). In other examples, the message may include any suitable data that may be used by application module 8. An example of such suitable data may include a Uniform Resource Locator (URL). In any case, in response to receiving the message, application module 8 may perform one or more operations associated with the message. In this way, if, for example, user 10 wishes to further view weather information at mobile computing device 2, use 10 may provide a user input at UI device 16 which causes application module 74 to send a message to mobile computing device 2. Application module 8 may use the message to perform one or more operations thereby enable user 10 to continue the user experience at mobile computing device 2 that began at portable computer terminal 12.

FIG. 3 is a conceptual diagram illustrating navigation of information to display different degrees of specificity of information, in accordance with techniques of the disclosure. As shown in FIG. 3, view 91 represents the current GUI displayed by UI device 16 of portable computer terminal 12. Initially, UI device 16 may display GUI 90 that comprises information displayed at a first degree of specificity. The first degree of specificity may represent a summary of information association with "Application A."

In one example, user 10 may wish to see more detailed information of "Application A." Consequently, user 10 may perform a vertical swipe gesture 93 in the direction indicated in FIG. 3. In response to receiving the gesture, portable computer terminal 12 may cause UI device 16 to display GUI 98. Conceptually, the change in view 91 from GUI 90 to GUI 98 in response to the gesture may be indicated by navigation 95. GUI 98 may include more detailed information associated with "Application A"—that is, in the current example, GUI 98 may display information of "Application A" at a greater degree of specificity than the first degree of specificity (e.g., GUI 90). GUI 98 may replace GUI 90 as the current view 91 displayed by UI device 16.

As shown in FIG. 3, when UI device 16 displays GUI 98 as the current view 91, user 10 may wish to navigate to the GUI of a different application, for example, "Application B" that may be executing on portable computer terminal 12. User 10 may perform a horizontal swipe gesture 101 in the direction indicated in FIG. 3 at UI device 16. In response to determining the gesture, portable computer terminal 12 may display GUI 94 as the current view 91. Conceptually, the change in view 91 from GUI 98 to GUI 94 in response to the gesture may be indicated by navigation 103. GUI 94 may include a summary of information of "Application B" and therefore the degree of specificity of information of "Application B" as displayed in GUI 94 may be less than the degree of specificity of "Application A" as displayed in GUI 98. Thus, rather than display GUI 100 which includes details for "Application B" in response to gesture 101, portable computer terminal 12 may display GUI 94, thereby enable user 10 to quickly navigate from detailed information of "Application A" to summary information of "Application B" without first displaying summary information of "Application A" as shown in GUI 90. In an alternative example, portable computer terminal 12 may, in response to determining gesture 101, may cause UI device 16 to display GUI 100 that includes details of "Application B" at a greater degree of specificity than information displayed in, for example, GUI 94. As shown in FIG. 3, portable computer terminal 12 may display GUIs 90, 92, 94, 96, 98, 100, and 102 in accordance with gestures and operations previously described and illustrated with the various example navigations.

In some examples, all of the information that portable computer terminal 12 generated for display at the second degree of specificity may not fit within the displayable area of UI device 16. In such examples, techniques of the present disclosure may enable user 10 to incrementally display different portions of the information at the second degree of specificity. For instance, the information generated for display by portable computer terminal 12 may be divided into one or more portions that are displayable by UI device 16. Initially, portable computer terminal 12 may display a first portion of the information at the second degree of specificity in GUI 98. User 10 may perform a vertical swipe gesture in the direction of bottom to top of UI device 16. In response to receiving input representing the vertical swipe gesture, portable computer terminal 12 may cause UI device 16 to display a second portion of the information at the second degree of specificity. The second potion of information may be different from the first portion of information. In some examples, the first portion of information may be removed from UI device 16 and the second portion of information may be displayed by UI device 16. UI device 16, in some examples, may display the transition from the first portion of information to the second portion of information as a scrolling effect or alternatively the first portion may be removed and the second portion may be added without a scrolling effect.

In some examples, UI device 16 may initially display GUI 90 as current view 91. User 10 may wish to change the settings of portable computer terminal 12. Such settings may include power management settings, setting to configure UI device 16, etc. To view such settings, user 10 may perform gesture 97, which may be a horizontal swipe gesture, in the direction indicated in FIG. 3. As an example, horizontal swipe gesture may be a different type of gesture than a vertical swipe gesture. In some examples, a horizontal swipe gesture in a first direction may be a different type of gesture than a horizontal swipe gesture in a second direction that is different than the first direction. Thus, different types of gestures may vary based on the motion, speed, direction, etc.

In response to determining the gesture, portable computer terminal 12 may cause UI device 16 to display GUI 92 as current view 91. Conceptually, the change in view 91 from GUI 90 to GUI 92 in response to the gesture may be indicated by navigation 99. Once GUI 92 is displayed by UI device 16 as current view 91, user 10 may perform one or more gestures at UI device 16 to change settings of portable computer terminal 12.

In some examples, applications executing on portable computer terminal 12 may be arranged as a prioritized group of applications or a "stack" of applications. In some examples, applications may be associated with priority values that are specified by a user or by another application. In some examples, the priority values may indicate a relevance of information received by portable computer terminal 12. In one example, the applications may be prioritized based at least in part on priority values associated with information for each of the applications. Therefore, the priority of applications may change as new information is received from mobile computing device 2 (e.g., information indicating higher and lower priorities such as severe weather, an urgent email, etc.). In some examples, application may be associated with priority values based on the priority of information associated with the respective applications. Applications may be ordered such that information of a highest priority application is displayed initially at UI device 16, while applications are ordered in descending priority such that a greater number of gestures may be required to access lower priority applications. As one example, in FIG. 3, "Application A" represented by GUI 90 may be initially displayed by UI device 16 while "Application C" represented by GUI 96 may be the lowest priority application. As can be seen from FIG. 3, more gestures may be required to access applications of decreasingly lower priorities, and therefore lower priority applications may be conceptually "farther" from the highest priority application that is initially displayed by UI device 16.

In one example, portable computer terminal 12 may receive from the mobile computing device 2, a plurality of units of information. The units of information may be discrete portions of information that may be associated with different applications of portable computer terminal 12. As one example, an information unit may include weather information that is associated with a weather application executing on portable computer terminal 12. One or more units of information may be associated with priority values. The priority values may indicate different priorities in a range of priorities from highest priority to lowest priority. In some examples, the priority values may be an integer value, enumerated value, etc. that indicates a priority.

Upon receiving the information units, portable computer terminal 12 may determine priority values associated with the respective units of information. Using the priority values, portable computer terminal 12 may determine an ordering of the applications based at least in part on the priority values of the respective units of information. In one example, portable computer terminal 12 may generate the ordering in a descending order from highest priority to lowest priority. As shown in FIG. 3 in the conceptual view of the group of applications, portable computer terminal 12 may generate for display the applications in the determined ordering from highest priority to lowest priority. Consequently, as previously described, UI device 16 may initially display GUI 90 of highest priority "Application A." "Application B" may have a lower priority than "Application A" and a higher priority than "Application C." "Application C" may have the lowest priority and there may be conceptually farthest from "Application A" or, stated another way, may be lowest in the stack of applications executing on portable computer terminal 12.

In some examples, portable computer terminal 12 may output one or more alerts based at least in part on a priority value associated with information received by portable computer terminal 12. In other examples, portable computer terminal 12 may output on or more alerts based on default settings of an application or settings provided by a user. Examples of alerts may include an audio alert, visual alert, haptic alert, etc. In the example of outputting an alert based on a priority value, portable computer 12 may receive information from mobile computing device 2. Upon receiving the information, portable computer terminal 12 may determine a priority value associated with the information. Using the priority value, portable computer terminal 12 may determine at least one alert that is associated with the priority value of the information. In response to determining the alert, portable computer terminal 12 may output the alert. Thus, in some examples, higher priority information may cause portable computer terminal 12 to one or more alerts associated with higher priority information, while lower priority information may cause portable computer terminal 12 to output different set of zero or more alerts associated with lower priority information.

Figure 4:
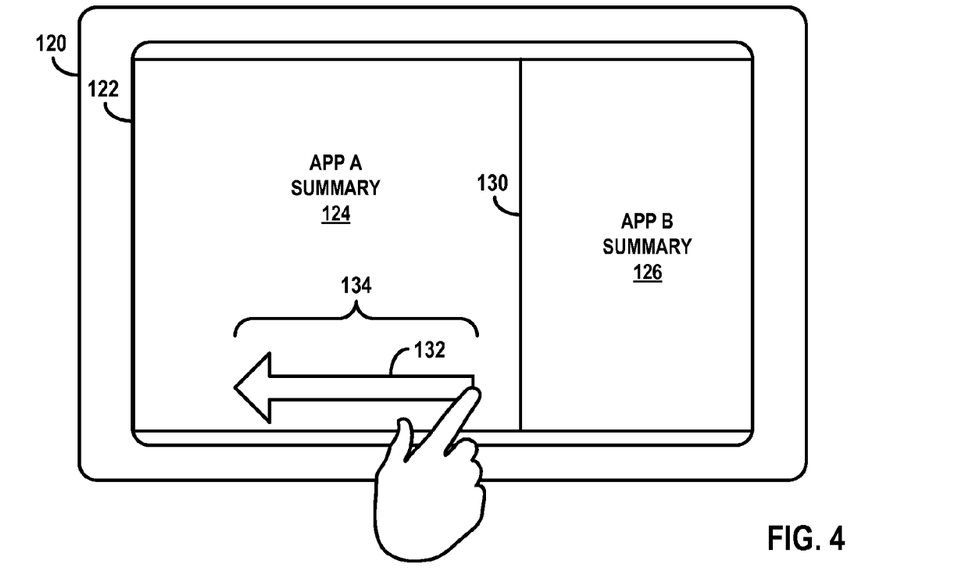
FIG. 4 is a conceptual diagram illustrating an example navigation of applications according to a predetermined value, in accordance with techniques of the disclosure.

FIG. 4 is a conceptual diagram illustrating an example navigation of applications according to a predetermined value, in accordance with techniques of the disclosure. FIG. 4 includes a UI device housing 120 that includes UI device 122. UI device housing 120 may be a fixture that includes UI device 122. UI device 122 may be similar to or the same as UI device 16 as described in FIGS. 1 and 2. UI device 122 may initially display graphical user interface (GUI) 124 of an "Application A."

The user may wish to change the display of GUI 124 that associated with "Application A" to GUI 126 that is associated with "Application B" by providing at gesture at UI device 16. In accordance with techniques of the disclosure, portable computer terminal that includes UI device 122 may cause UI device 112 to remove GUI 124 from display and display GUI 126 if the distance of the gesture provided by the user is greater than a predetermined distance. In some examples, the predetermined distance may be set by the user or may be a default value specified by an application executing on the portable computer terminal.

As shown in the example of FIG. 4, user may perform a horizontal swipe gesture 132 in the direction indicated in FIG. 4. In response to receiving the gesture, the portable computer terminal may determine a distance 134 of gesture 132. The portable computer terminal may further determine whether distance 134 of gesture 132 is greater than a predetermined distance. If distance 134 is greater than the predetermined distance, the portable computer terminal may cause UI device 122 to remove GUI 124 from display and display GUI 126. If distance 134 is not greater than the predetermined distance, the portable computer terminal may cause UI device 122 to continue to display GUI 124.

While the previous example has been described as a determining whether distance 134 is greater than a predetermined distance, such techniques may also be applied by determining an initial location at which the finger of the user is detected. Upon detecting the location, the portable computer terminal may determine an impact threshold, which may be another, different location of UI device 122. The location of the impact threshold may be a predetermined distance from the initial location of UI device 122 at which the user's finger was detected. Consequently, the portable computer terminal may determine, as the user performs the gesture, whether the user's finger traverses past the impact threshold. If the user's finger traverses past the impact threshold, the portable computer terminal may determine that the distance of the gesture is greater than the predetermined distance.

In some examples, UI device 122 may continuously display the movement of GUI 124 and 126 in response to gesture 132. Consequently as shown in FIG. 4, UI device 122 may continuously remove from display GUI 124 as the user performs gesture 132. In some examples, UI device 122 may have one or more pixels that can be assigned different values to display a graphical user interface. As UI device 122 continuously removes from display GUI 124, the quantity of pixel values that represent the GUI 124 may continuously decrease. Thus, GUI 124 may move from right to left and out of view as GUI 124 is removed from display by UI device 122. UI device 122 may also continuously display GUI 126 as the user performs gesture 132. Thus, GUI 126 may move from right to left and into view as GUI 126 is displayed by UI device 122. As UI device 122 continuously displays a greater portion of GUI 126, the quantity of pixel values that represent the GUI 126 may continuously decrease. As shown in FIG. 4, as UI device 122 may display boundary 130 between GUI 124 and GUI 126 as the user performs gesture 132.

Figure 5:
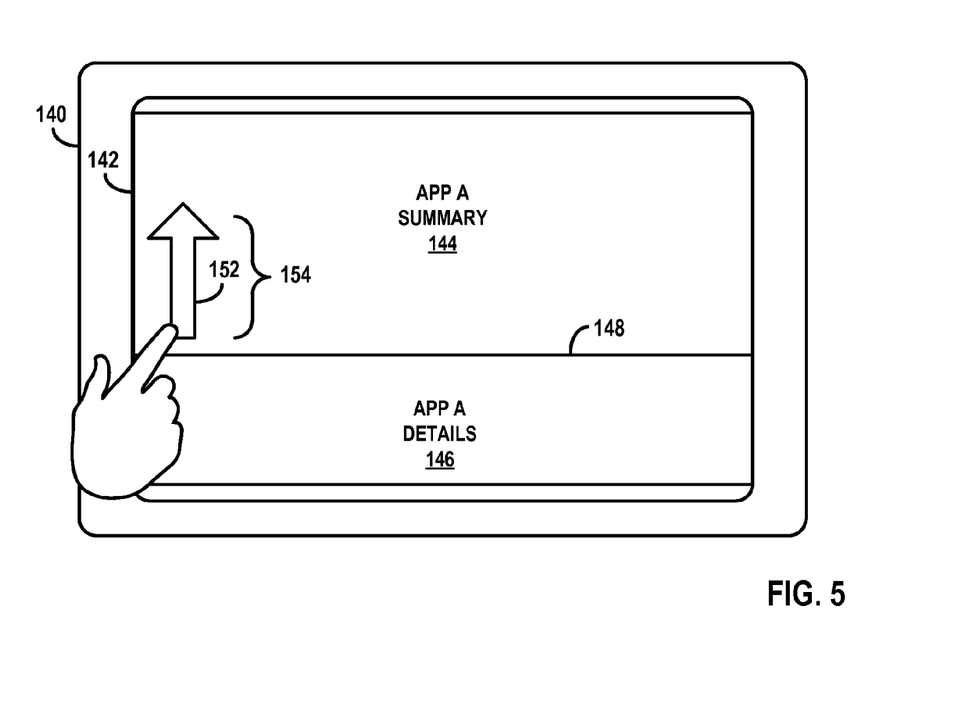
FIG. 5 is a conceptual diagram illustrating an example navigation of information at differing degrees of specificity, in accordance with techniques of the disclosure.

FIG. 5 is a conceptual diagram illustrating an example navigation of information at differing degrees of specificity, in accordance with techniques of the disclosure. FIG. 5 includes a UI device housing 140 that includes UI device 142. UI device housing 140 may be a fixture that includes UI device 142. UI device 122 may be similar to or the same as UI device 16 as described in FIGS. 1 and 2. UI device 122 may initially display graphical user interface (GUI) 144 of an "Application A."

The user may wish to change the display of GUI 124 that displays information of "Application A" at a first degree of specificity to GUI 126 that displays information of "Application A" at a second degree of specificity. In the example of FIG. 5, the second degree of specificity of the information may be greater than the first degree of specificity of the information. In accordance with techniques of the disclosure, portable computer terminal that includes UI device 142 may cause UI device 142 to remove GUI 144 from display and display GUI 146 if the distance of a gesture provided by the user at UI device 142 is greater than a predetermined distance. In some examples, the predetermined distance may be set by the user or may be a default value specified by an application executing on the portable computer terminal.

As shown in the example of FIG. 5, user may perform a vertical swipe gesture 152 in the direction indicated in FIG. 5. In response to receiving the gesture, the portable computer terminal may determine a distance 154 of gesture 152. The portable computer terminal may further determine whether distance 154 is greater than a predetermined distance. If distance 154 is greater than the predetermined distance, the portable computer terminal may cause UI device 142 to remove GUI 144 from display and display GUI 146. If distance 154 is not greater than the predetermined distance, the portable computer terminal may cause UI device 142 to continue to display GUI 144.

While the previous example has been described as a determining whether distance 154 is greater than a predetermined distance, such techniques may also be applied by determining an initial location at which the finger of the user is detected. Upon detecting the location, the portable computer terminal may determine an impact threshold, which may be another, different location of UI device 142. The location of the impact threshold may be a predetermined distance from the initial location of UI device 142 at which the user's finger was detected. Consequently, the portable computer terminal may determine, as the user performs the gesture, whether the user's finger traverses past the impact threshold. If the user's finger traverses past the impact threshold, the portable computer terminal may determine that the distance of the gesture is greater than the predetermined distance.

In some examples, UI device 142 may continuously display the movement of GUI 144 and 146 in response to gesture 152. Consequently as shown in FIG. 5, UI device 142 may continuously remove from display GUI 144 as the user performs gesture 154. Thus, GUI 144 may move from bottom to top and out of view as GUI 144 is removed from display by UI device 142. UI device 142 may also continuously display GUI 146 as the user performs gesture 152. Thus, GUI 146 may move from bottom to top and into view as GUI 146 is displayed by UI device 142. Thus, as shown in FIG. 5, as UI device 142 displays boundary 148 between GUI 144 and GUI 146 as the user performs gesture 152.

Figure 6:
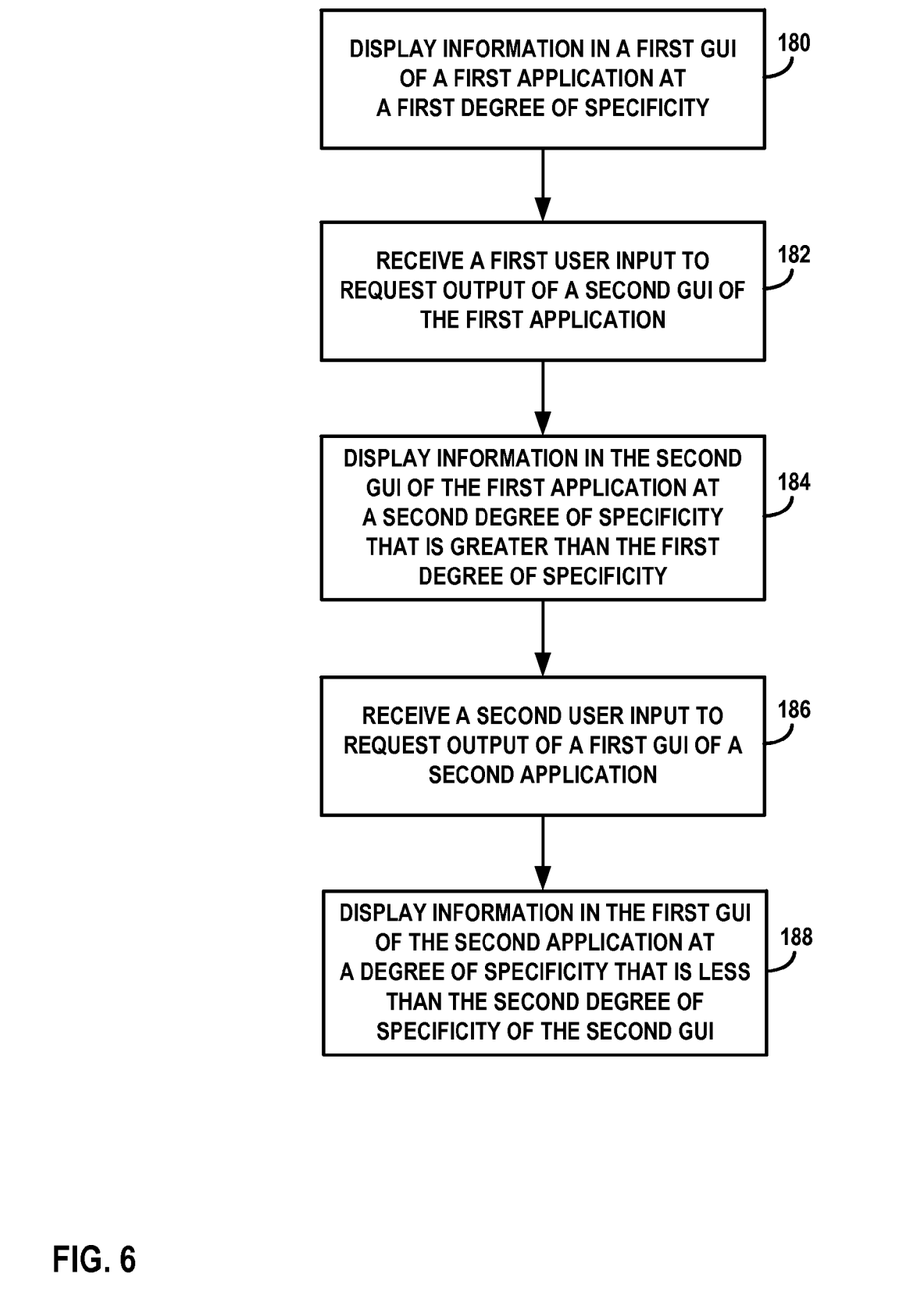
FIG. 6 is a flow diagram illustrating example operations of a computing device to display information according to different degrees of specificity, in accordance with one or more techniques of the present disclosure.

FIG. 6 is a flow diagram illustrating example operations of a computing device to display information according to different degrees of specificity, in accordance with one or more techniques of the present disclosure. For purposes of illustration only, the example operations are described below within the context of portable computer terminal 12, as shown in FIGS. 1 and 2.

In the example of FIG. 6, portable computer terminal 12 may initially display, at UI device 16 of portable computer terminal 12 that is operatively coupled to mobile computing device 2, a first graphical user interface (GUI) 20 of application executing at portable computer terminal 12. GUI 20 displays information received from mobile computing device 2 at a first degree of specificity (180). User 10 may perform a gesture that is received by UI device 16 to request output of a second GUI of the application at a second degree of specificity (182). In response to receiving the input to request output of the second GUI of the application, portable computer terminal 12 may cause UI device 12 to display, at UI device 16, GUI 28 and removing GUI 20 from display at UI device 12.

In some examples, GUI 20 is different from GUI 28 and the degree of specificity of the information included in GUI 28 may be greater than the degree of specificity of information included in GUI 20 (184). While UI device 16 displays GUI 28, user 10 may perform another gesture that is received by UI device 16 and requests display of a GUI of a different, second application (186). Portable computer terminal 12, in response to receiving the gesture, may display information in a first GUI of the second application at a degree of specificity that is less than the degree of specificity of GUI 28 (188).

In one example, displaying the second GUI and removing the first GUI from display may include displaying the second GUI and removing the first GUI from display without causing a portion of existing graphical content of the first GUI to be visually magnified in the second GUI. In another example, the second input may be a different type of input than the first input and the first GUI of the second application may include information displayed at a first degree of specificity that is greater than a second degree of specificity of information received from the mobile computing device that is displayable in a second GUI of the second application.

In one example, the second input may include a haptic input that is indicated by a change in acceleration of the portable computer terminal. In one example, the operations may include, in response to receiving a third input to display the second GUI of the second application, displaying, at the presence-sensitive display device of the portable computer terminal, the second GUI of the second application and removing the first GUI of the second application from display. In one example, the first input may include a vertical swipe touch gesture at the presence-sensitive display device, and the second input may include a horizontal swipe touch gesture.

In one example, the operations may include receiving, by the portable computer terminal and from the mobile computing device, a plurality of units of information; determining, by the portable computer terminal, priority values associated with the respective units of information; determining, by the portable computer terminal, an ordering of the ordered group of applications based at least in part on the priority values of the respective units of information; and generating for display, by the portable computing, GUIs of the applications in the ordered group of applications in the determined ordering.

In one example, the ordered group of applications in the determined ordering may be ordered in descending order from a highest priority value to a lowest priority value, wherein the highest priority value has a highest priority in a range of priority values, and wherein the lowest priority value has a lowest priority in the range of priority values. In one example, the operations may include determining, by the portable computer terminal, at least one alert that is associated with a priority value of at least one unit of information of the plurality of units of information; and displaying, by the portable computer terminal, the at least one alert. In one example, the at least one alert is selected from the group consisting of an audio alert, a visual alert, and a haptic alert.

In one example, the operations may include determining, by the portable computer terminal, that the touch gesture comprises a motion of an input unit from a first location at the presence-sensitive display device to a second location at the presence-sensitive display device; determining, by the portable computer terminal, a distance between the first and second locations; determining, by the portable computer terminal, whether the distance is greater than a predetermined distance; and if the distance is greater than the predetermined distance, displaying, at the presence-sensitive display device of the portable computer terminal, the second GUI and removing the first GUI from display.

In one example, the operations may include continuously removing the first GUI from display, at the presence-sensitive display device of the portable computer terminal, such that a first quantity of pixel values of the presence-sensitive display device representing the first GUI continuously decreases; and continuously generating the second GUI for display, at the presence-sensitive display device of the portable computer terminal, such that a second quantity of pixel values of the presence-sensitive display device representing the first GUI continuously increases. In one example, the operations may include determining, by the portable computer terminal, a quantity of applications included in the ordered group of applications executing on the portable computer terminal; and displaying, at the presence-sensitive display device of the portable computer terminal, an indicator that indicates the quantity of applications in the ordered group of applications. In one example, the input may include a haptic input that is indicated by a change in acceleration of the portable computer terminal.

In one example, the operations may include receiving, at the presence-sensitive screen of the portable computer terminal, a second input; and in response to receiving the second input, sending, by the portable computer terminal and to the mobile computing a device, a message that is usable by the mobile computing device to perform an operation associated with a second application, wherein the second application is associated with the first application. In one example, the operations may include displaying, at the presence-sensitive screen of the portable computer terminal, a first portion of the information at the second degree of specificity in the second GUI; receiving, at the presence-sensitive screen of the portable computer terminal, a second input; and in response to receiving the second input, displaying, at the presence-sensitive screen of the portable computer terminal, a second portion of the information at the second degree of specificity in the second GUI, wherein the second portion of information is different than the first portion of information.

In one example, the operations may include determining, by the portable computer terminal, a location of the presence-sensitive display device at which the input was received; determining, by the portable computer terminal, whether the input was received within a predetermined region of the presence-sensitive display device; and if the input was received within the predetermined region of the presence-sensitive display device, displaying, at the presence-sensitive display device of the portable computer terminal, the second GUI and removing the first GUI from display. In one example, only the first GUI or the second GUI may be displayable at the presence-sensitive display at a single time. In one example, the input may include a touch gesture. In one example, the second GUI of the first application may display the information received from the mobile computing device at a second degree of specificity that is greater than the first degree of specificity.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   outputting, by a wearable portable computer terminal and for display at an output device, a first graphical user interface (GUI) of a first application, wherein the first application is included in a group of applications that are ordered for display, wherein the first GUI of the first application displays a first summary of first information received from a mobile computing device at a first degree of specificity;
   receiving, by the wearable portable computer terminal, a vertical swipe input received at a first location of an input device that corresponds to a region of the output device that outputs the first GUI of the first application, the vertical swipe input indicating a request to display a second GUI of the first application;
   responsive to receiving the first input:
      outputting, by the wearable portable computer terminal and for display, the second GUI of the first application, and
      removing the first GUI of the first application from display, wherein the second GUI is different from the first GUI, and wherein the second GUI of the first application displays details of the first information received from the mobile computing device at a second degree of specificity that is greater than the first degree of specificity; and
   while the second GUI of the first application is displayed and responsive to receiving a horizontal swipe input at a second location of the input device that corresponds the region of the output device that outputs the second GUI, the horizontal swipe input indicating a request to display a first GUI of a second application in the group of applications, the second application in the group of applications being at least one of a next higher-ordered application or a next lower-ordered application in relation to an ordering of the first application in the group of applications that are ordered for display:
  outputting, by the wearable portable computer terminal and for display, the first GUI of the second application, wherein the first GUI of the second application displays a second summary of second information received from the mobile computing device at the first degree of specificity, and
  removing the second GUI of the first application from display without displaying the first GUI of the first application subsequent to receiving the horizontal swipe input.

2. The method of claim 1, wherein outputting for display the second GUI and removing the first GUI from display comprises outputting for display the second GUI and removing the first GUI from display without causing a portion of existing graphical content of the first GUI to be visually magnified in the second GUI.

3. The method of claim 1 further comprising:
  wherein the first GUI of the second application includes the second information displayed at the first degree of specificity that is greater than the second degree of specificity of the second information received from the mobile computing device that is displayable in a second GUI of the second application.

4. The method of claim 3, wherein the second input comprises a haptic input that is indicated by a change in acceleration of the wearable portable computer terminal.

5. The method of claim 4, further comprising:
  responsive to receiving a third input to display the second GUI of the second application, outputting, by the wearable portable computer terminal for display, the second GUI of the second application and removing the first GUI of the second application from display.

6. The method of claim 1, further comprising:
  receiving, by the wearable portable computer terminal and from the mobile computing device, a plurality of units of information;
  determining, by the wearable portable computer terminal, priority values associated with the respective units of information;
  determining, by the wearable portable computer terminal, an ordering of the ordered group of applications based at least in part on the priority values of the respective units of information; and
  generating for display, by the wearable portable computer terminal, GUIs of the applications in the ordered group of applications in the determined ordering.

7. The method of claim 1, wherein the ordered group of applications in the determined ordering are ordered in descending order from a highest frequency of use to a lowest frequency of use, wherein the highest frequency of use has a highest frequency in a range of frequency values, and wherein the lowest frequency of use has a lowest frequency in the range of frequency values.

8. The method of claim 6, further comprising:
  determining, by the wearable portable computer terminal, at least one alert that is associated with a priority value of at least one unit of information of the plurality of units of information; and
  outputting, by the wearable portable computer terminal and for display, the at least one alert.

9. The method of claim 8, wherein the at least one alert is selected from the group consisting of an audio alert, a visual alert, and a haptic alert.

10. The method of claim 1, further comprising:
  determining, by the wearable portable computer terminal, that the vertical swipe input comprises a motion of an input unit from a first location at the input device to a second location at input device;
  determining, by the wearable portable computer terminal, a distance between the first and second locations;
  determining, by the wearable portable computer terminal, whether the distance is greater than a predetermined distance; and
  if the distance is greater than the predetermined distance, outputting, by the wearable portable computer terminal and for display, the second GUI of the first application and removing the first GUI of the first application from display.

11. The method of claim 10, wherein outputting the second GUI of the first application and removing the first GUI of the first application from display further comprises:
  continuously removing the first GUI from display, at the output device of the wearable portable computer terminal, such that a first quantity of pixel values of the presence-sensitive display device representing the first GUI continuously decreases; and
  continuously generating the second GUI for display, at the output device of the wearable portable computer terminal, such that a second quantity of pixel values of the output device representing the first GUI continuously increases.

12. The method of claim 1, further comprising:
  determining, by the wearable portable computer terminal, a quantity of applications included in the ordered group of applications; and
  outputting, by the wearable portable computer terminal and for display, an indicator that indicates the quantity of applications in the ordered group of applications.

13. The method of claim 1, wherein the input comprises a haptic input that is indicated by a change in acceleration of the wearable portable computer terminal.

14. The method of claim 1, further comprising:
  responsive to receiving a third input at the input device, sending, by the wearable portable computer terminal and to the mobile computing device, a message that is usable by the mobile computing device to perform an operation associated with a second application, wherein the second application is associated with the first application.

15. The method of claim 1 further comprising:
  outputting by the wearable portable computer terminal and for display at the output device, a first portion of the first information at the second degree of specificity in the second GUI of the first application; and
  responsive to receiving a user input at the input device, outputting, by the wearable portable computer terminal and for display, a second portion of the first information at the second degree of specificity in the second GUI of the first application, wherein the second portion of the first information is different than the first portion of the first information.

16. The method of claim 1, further comprising:
  determining, by the wearable portable computer terminal, a location of the input device at which the vertical swipe input was received;
  determining, by the wearable portable computer terminal, whether the vertical swipe input was received within a predetermined region of the input device; and
  if the vertical swipe input was received within the predetermined region of the input device, displaying, at a presence-sensitive display device of the wearable portable computer terminal, the second GUI of the first application and removing the first GUI from display of the first application.

17. The method of claim 1, wherein only the first GUI of the first application or the second GUI of the first application is displayable at the output device at a single time.

18. The method of claim 1, wherein each of the vertical swipe input and the horizontal swipe input comprises a touch gesture.

19. A non-transitory computer-readable storage medium encoded with instructions that, when executed, cause one or more processors of a wearable portable computer terminal to perform operations comprising:
 outputting, for display at an output device that is operatively coupled to the wearable portable computer terminal, a first graphical user interface (GUI) of a first application, wherein the first application is included in a group of applications that are ordered for display, wherein the first GUI of the first application displays a first summary of first information received from a mobile computing device at a first degree of specificity;
 receiving a vertical swipe input received at a first location of an input device that corresponds to a region of the output device that outputs the first GUI of the first application, the vertical swipe input indicating a request to display a second GUI of the first application;
 responsive to receiving the first input:
  outputting, for display, the second GUI of the first application, and
  removing the first GUI of the first application from display, wherein the second GUI is different from the first GUI, and wherein the second GUI of the first application displays details of the first information received from the mobile computing device at a second degree of specificity that is greater than the first degree of specificity; and
 while the second GUI of the first application is displayed and responsive to receiving a horizontal swipe input at a second location of the input device that corresponds the region of the output device that outputs the second GUI, the horizontal swipe input indicating a request to display a first GUI of a second application in the group of applications, the second application in the group of applications being at least one of a next higher-ordered application or the a next lower-ordered application in relation to an ordering of the first application in the group of applications that are ordered for display:
  outputting, for display, the first GUI of the second application, wherein the first GUI of the second application displays a second summary of second information received from the mobile computing device at the first degree of specificity, and
  removing the second GUI of the first application from display without displaying the first GUI of the first application subsequent to receiving the horizontal swipe input.

20. A wearable portable computer terminal comprising:
at least one processor; and
at least one module operable by the at least one processor to:
 output, for display at an output device that is operatively coupled to the wearable portable computer terminal, a first graphical user interface (GUI) of a first application, wherein the first application is included in a group of applications that are ordered for display, wherein the first GUI of the first application displays a first summary of first information received from a mobile computing device at a first degree of specificity;
 receive a vertical swipe input received at a first location of an input device that corresponds to a region of the output device that outputs the first GUI of the first application, the vertical swipe input indicating a request to display a second GUI of the first application;
 responsive to receiving the first input:
  output, for display, the second GUI of the first application, and
  remove the first GUI of the first application from display, wherein the second GUI is different from the first GUI, and wherein the second GUI of the first application displays details of the first information received from the mobile computing device at a second degree of specificity that is greater than the first degree of specificity; and
 while the second GUI of the first application is displayed and responsive to receiving a horizontal swipe input at a second location of the input device that corresponds the region of the output device that outputs the second GUI, the horizontal swipe input indicating a request to display a first GUI of a second application in the group of applications, the second application in the group of applications being at least one of a next higher-ordered application or the a next lower-ordered application in relation to an ordering of the first application in the group of applications that are ordered for display:
  output, for display, the first GUI of the second application, wherein the first GUI of the second application displays a second summary of second information received from the mobile computing device at the first degree of specificity, and
  remove the second GUI of the first application from display without displaying the first GUI of the first application subsequent to receiving the horizontal swipe input.

\* \* \* \* \*